United States Patent

[11] 3,608,054

| [72] | Inventors | William M. Alvino<br>Penn Hills, Pittsburgh;<br>James H. Freeman, Murrysville, both of Pa. |
|---|---|---|
| [21] | Appl. No. | 724,728 |
| [22] | Filed | Apr. 29, 1968 |
| [45] | Patented | Sept. 21, 1971 |
| [73] | Assignee | Westinghouse Electric Corporation<br>Pittsburgh, Pa. |

[54] CAST LUBRICATING FILMS AND COMPOSITES THEREOF
6 Claims, 2 Drawing Figs.

[52] U.S. Cl. ........................................................ 264/309,
117/124 E, 117/132 B, 252/12, 264/331
[51] Int. Cl. ........................................................ B44d 1/36,
B44d 5/08
[50] Field of Search ............................................. 117/132 B,
132 CF, 124 E, 94, 161 UN, 161 P, 123 D; 252/12,
12.2, 12.4, 12.6; 264/309, 331

[56] References Cited
UNITED STATES PATENTS

| 2,686,155 | 8/1954 | Willis et al. | 252/12 |
| 2,824,060 | 2/1958 | White | 252/12 X |
| 2,798,005 | 7/1957 | Love | 117/132 X |
| 2,813,041 | 11/1957 | Mitchell et al. | 117/132 X |
| 2,932,503 | 4/1960 | Le Van | 117/132 UX |
| 3,026,281 | 3/1962 | Harren et al. | 117/123 X |
| 3,079,281 | 2/1963 | Dexter et al. | 117/123 X |
| 3,082,184 | 3/1963 | Falgiatore et al. | 117/123 X |
| 3,179,634 | 4/1965 | Edwards | 117/128.4 |
| 3,179,635 | 4/1965 | Frost et al. | 260/78 UX |
| 3,300,667 | 1/1967 | Boes et al. | 252/506 X |
| 3,342,667 | 9/1967 | Berlinghof | 117/132 UX |
| 3,392,144 | 7/1968 | Holub | 117/161 X |
| 3,420,795 | 1/1969 | Angelo | 117/161 X |
| 3,428,486 | 2/1969 | George | 117/161 X |
| 3,440,215 | 4/1969 | Holub | 117/161 X |

OTHER REFERENCES

Devine et al., " Aromatic Polyimide Compositions for Solid Lubrication," Lubrication Engineering, June 1964, pp. 225- 230.

Campbell et al., " Polyimide Solid Lubricants," Lubrication Engineering, July 1967, pps. 288- 294.

*Primary Examiner*—William D. Martin
*Assistant Examiner*—Harry J. Gwinnell
*Attorneys*—F. Shapoe and A. Mich, Jr.

ABSTRACT: An antifriction high temperature composite is formed of a metal or other support or substrate and a cast thin lubricating film. The thin film has a plastic matrix containing a multiplicity of dispersed small discrete solid lubricant filler particles. The plastic is either an aromatic polyamide-imide or an aromatic polyimide and the filler is a finely divided solid lubricant such as $MoS_2$.

PATENTED SEP 21 1971                3,608,054

WITNESSES
Robert Baird
Daniel P. Cillo

INVENTORS
William M. Alvino
& James H. Freeman.
BY Alex Mich Jr.
ATTORNEY 3,608,054

1

CAST LUBRICATING FILMS AND COMPOSITES THEREOF

BACKGROUND OF THE INVENTION

This invention relates to doped organic polymer antifriction films cast on a substrate. More particularly, this invention relates to aromatic polyamide-imide or aromatic polyimide high temperature films containing a solid lubricant filler and exhibiting tear resistance, good durability and lubricating properties under frictional loading and the capability of being cast on a supporting substrate.

There is a need for film forming organic polymers with good durability and lubricating properties at high temperatures. These films would be useful as an economical method of obtaining large area antifriction surfaces. They could be cast on metal foil or metal sheets and would be useful for many other applications such as dry sleeve bearings with good lubricating properties.

Few organic polymers exhibit excellent antifrictional characteristics and none of them combine high temperature serviceability (above 450° F.) with good lubricating properties. The organic resin bonded solid lubricant compositions in use have been operable at low temperatures, but above 400° F. their wear life drops rapidly and few are considered satisfactory for application above 500° F. These compositions are generally molded and must undergo expensive machining to shape them to their end use.

SUMMARY OF THE INVENTION

Accordingly, it is the general object of this invention to provide new and improved high temperature, abrasion resistant lubricating films that can be cast on and bonded to metal and other suitable substrates.

It is another object of this invention to provide a new and improved lubricating film-metal composite that can be used without machining.

Briefly, the foregoing objects are accomplished by throughly dispersing in the matrix of high temperature capability aromatic polyamide-imide or aromatic polyimide resins, one or more finely divided discrete solid lubricant particles such as $MoS_2$, $MoSe_2$, $WS_2$, $WSe_2$, $NbS_2$, $NbSe_2$, $TaS_2$ or $TaSe_2$ and casting the filled resins on a metal foil backing.

The flexible metal foil backing provides strength yet can be readily formed and shaped. The antifriction film-metal foil composite of this invention can be easily mass produced and stored in long roll form. Such composites can be prepared flat, then cut and bent or formed into cylindrical shape and joined by various techniques such as clamping and soldering. They would not have to be molded or machined. They can also be used as antifriction inserts or liners which can be spring fitted or bonded into retainer regions such as rings, tubes and sleeves. Such composites can also be fastened by adhesives or other means to solid flat slip surfaces.

Employing the antifriction surface in foil form also makes it possible to consider the ready repair and relining of worn bearings. Free unsupported antifriction films may be obtained by stripping the cast film from the substrate prior to or after final cure. These free films are less rigid and may have utility as film inserts or surfacing materials where a thermally stable carrier for dry lubricant is desired but the spring back or support characteristic of the flexible metal foil is not desired. Such films could be inserted into load bearing areas and used sacrificially until destroyed, then replaced by another film liner.

BRIEF DESCRIPTION OF THE DRAWINGS

For a better understanding of the nature and objects of the invention reference may be had to the following drawings, in which.

2

DESCRIPTION OF THE PREFERRED EMBODIMENTS

Figure 1:
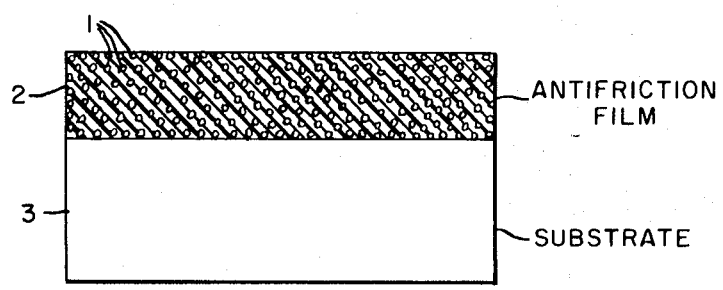
FIG. 1 is a cross-sectional perspective view of the composite metal foil and filled film of this invention.

It has now been discovered that new and improved lubricating films can be cast on flexible metal foil surfaces, can operate in the absence of added lubricant and are capable of performing at high temperatures.

Suitable resins for use in accordance with this invention are known as aromatic polyimides or aromatic polyamide-imides and the recurring unit:

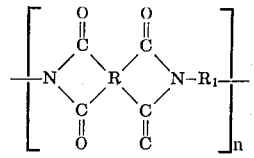

wherein $n$ is at least 5, R is at least one tetravalent organic radical selected from the group consisting of:

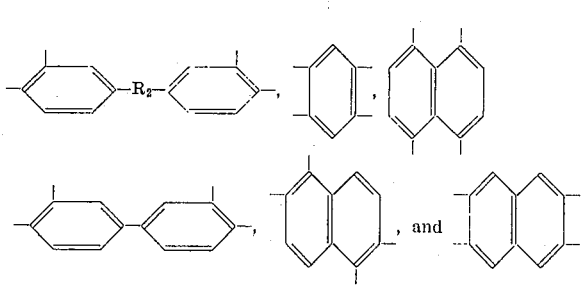

$R_2$ being selected from the group consisting of divalent aliphatic hydrocarbon radicals having from 1 to 4 carbon atoms and carbonyl, oxy, sulfo and sulfonyl radicals and in which $R_1$ is at least one divalent radical selected from the group consisting of:

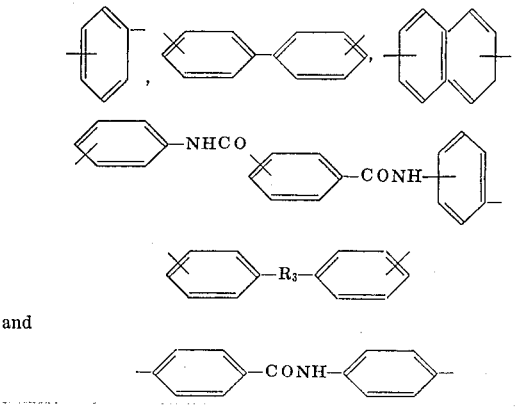

and in which $R_3$ is a divalent organic radical selected from the group consisting of $R_2$, silico and amindo radicals. Polymers containing two or more of the R and/or $R_1$ radicals, especially multiple series of $R_1$ containing amido radicals, are particularly valuable in some instances. In general, polymers of this class are believed to require a molecular weight in excess of about 5000 in order to exhibit useful film forming properties.

The aromatic polyamide-imide resins, represented by certain of the foregoing formulas are described and claimed in U.S. Pat. No. 3,179,635 assigned to the assignee of this invention, and reference may be made thereto for details on the methods of preparing those resins. For additional details reference may also be made to an article by Frost and Bower, entitled "Aromatic Polyimides" in J. Polymer Science, Part A, Vol. 1, pp. 3135–3150 (1963). Reference may be had to U.S. Pat. Nos. 3,279,631; 3,179,632; 3,179,633 and 3,179,634 for details on preparing aromatic polyimide resins.

The described essentially insoluble solid resinous films are derived from certain soluble aromatic polyamic acid precursors. The preparation of aromatic polyamic acid precursors, suitable for use in this invention, is described in detail in U.S. Pat. No. 3,179,635 assigned to the assignee of this invention and U.S. Pat. Nos. 3,179,614; 3,179,631; 3,179,632; 3,179,633 and 3,179,634.

Aromatic polyamic acids suitable for use in this invention have the recurring unit:

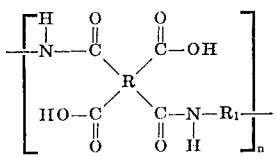

in which $n$ is at least 5 and R and $R_1$ are identical to the description hereinabove relating to the solid insoluble imidized aromatic polyimide and polyamide-imide resins. It should be understood that suitable polyamic acid precursors may also contain two or more different R and/or $R_1$ radicals.

Suitable solvents for the described aromatic polyamic acid precursors are, for example, the normally liquid organic solvents of the N,N-dialkylcarboxylamide class, preferably the lower molecular weight members of this class. Typical examples include dimethyl formamide, dimethyl acetamide, N-methyl pyrrolidone, as well as dimethyl sulfoxide and pyridine. The solvents can be used individually, in combinations of two or more, or in combination with relatively poor liquid organic solvents or diluents such for example, as benzene, benzonitrile, dioxane, butyrolactone, xylene, toluene, and cyclohexane. The addition of water in any appreciable amount cannot be tolerated. The solvents are easily removed by heating in a drying tower so that the condensation reaction which takes place in converting the precursors to the solid resin, may be immediately initiated in the heated curing tower. The precursor solutions are all highly viscous and rather low solid concentrations, below about 30 percent by weight, are recommended if reasonably fluid solutions are desired.

In addition to the aforementioned aromatic polyimide and polyamide-imide recurring unit wherein R was a tetravalent organic radical, other polyamide-imide resins are suitable in this invention which are derived from substituted monoanhydrides of aromatic tricarboxylic acids and have the structure:

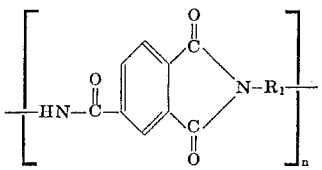

wherein $R_1$ and $n$ are identical to the description hereinabove relating to the solid aromatic polyimide and polyamide-imide resins.

The soluble precursors for the above trivalent derived polyamide-imide resins may be generically described as polyamide acids and include in reheating form one or both of the structures:

and

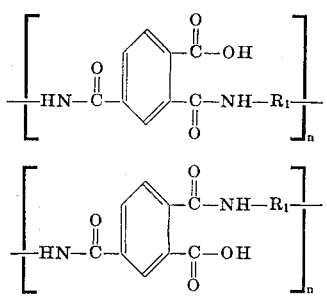

wherein R and $n$ are identical to the description hereinabove. For details on the preparation of these soluble precursors, and the solid resins therefrom, reference may be had to British Pat. Nos. 1,056,564, and 1,032,649.

The same solvents as previously described can be used for the above aromatic polyamide acid precursors.

Referring now to FIG. 1, the antifriction film comprising filler particles 1 imbedded in aromatic polyamide-imide or aromatic polyimide resin 2 has been cast and cured on a metal, glass, ceramic, solid synthetic resin or other suitable smooth surfaced substrate 3.

Figure 2:
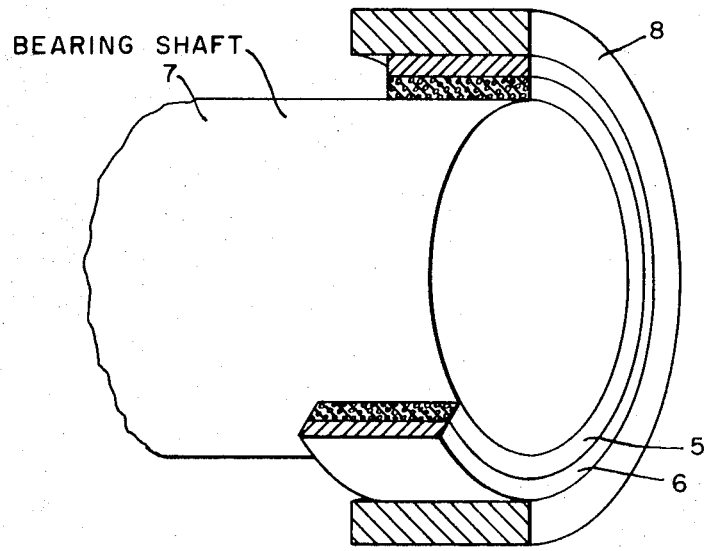
FIG. 2 is a partially sectional view of one embodiment of this invention.

FIG. 2 shows the antifriction lubricating film 5 cast on metal foil 6 used as a dry sleeve bearing between a shaft 7 and a bearing sleeve 8.

The solid lubricant fillers that are satisfactory in the production of organic resin bonded high temperature antifriction cast flexible films include $MoS_2$, $MoSe_2$, $WS_2$, $WSe_2$, $NbSe_2$, $NbS_2$, $TaSe_2$, and $TaS_2$. These are all lubricants well known in the art and most are described in U.S. Pat. No. 3,300,667. Of these $MoS_2$ proved to be the preferred filler. The preferred particle size of the lubricant fillers is about one half to 20 microns. Above this size, particles tend to agglomerate, although with maximum dispersion in thick films satisfactory results should be obtainable up to a particle size of about 50 microns. Below one half micron the fillers are costly and the particles susceptible to oxidation. These solid lubricant fillers in the preferred particle size range were loaded into the resin in concentrations ranging between 4 to 80 weight percent with excellent results and it is believed that a 95 weight percent loading with maximum particle dispersion would be practical for use on flat or moderately curved surfaces.

Although the experimental friction tests set forth hereinbelow were run at 437° F. it is estimated that the antifriction films of this invention, cast on a suitable substrate, would be operable for use up to about 650° F. A succession of multilayer films up to about 20 to 30 mils thick could be used in this invention. At higher film thicknesses curing problems are encountered. The films may be cast in thicknesses as low as one-quarter mil where small particle size fillers are used.

The substrate thickness is limited only by manufacturing capability. Copper, steel or aluminum foil of 1 mil to 15 mils thickness would be preferred as the substrate because antifriction films with these substrates could be made in a continuous manner, easily rolled up for storage and used in large area applications. Such thin film substrate composites would also be easy to cut and bend. Thick plates could also be used as substrate in which case the resin solution containing the lubricating fillers can be sprayed or painted on and cured.

EXAMPLE I

A polyamic acid precursor solution was formed by dissolving a powdered mixture of a resin obtained from equimolar quantities of 4-acid chloride of trimellitic anhydride and p,p′methylene bis(dianiline) in dimethyl acetamide to give a 31 percent solids solution having a viscosity of about 1080 centipoises at 25° C.

To each of three batches containing 100 grams of the above solution was added respectively, 3.1 grams (10 weight percent based on the weight of resin solids) of: $MoS_2$ having a particle size between 1 to 5 microns, graphite having a particle size of about 40 microns, and powdered polytetrafluorethylene having a particle size of about 1 micron. The solutions were thoroughly stirred mechanically and left to stand. The graphite mixture started settling in about 30 minutes whereas the $MoS_2$ mixture still appeared homogeneous after 5 hours. The mixture containing polytetrafluoroethylene dispersed well during the mixing but considerable separation occurred after 5 minutes of standing.

Prior to the film casting operation the solutions were again stirred for 5 minutes. A small amount of each solution was poured onto a glass plate and films were cast using a film applicator with a wet film gap setting of 30 mils. The films were cured for 2 hours at 100° C. and 1 hour at 150° C. The dry film thickness of the samples was about 4 mils.

The 10 weight percent $MoS_2$ filled film had a mirrorlike finish and after stripping from the glass substrate was flexible had excellent tear resistance and could be creased 180° without rupture. Both the graphite and polytetrafluoroethylene filled films were dull and unlike the $MoS_2$ filled film, badly blistered and lacked tear resistance. Agglomeration of the polytetrafluoroethylene and graphite particles was apparent. Good dispersion was achieved with the $MoS_2$ particles.

EXAMPLE II

To a 100 gram batch of the resin solution of Example I was added 3.1 grams (10 weight percent based on the weight of resin solids) of $MoS_2$ having a particle size between 1 to 5 microns. This was cast on a ¾ inch diameter circular steel disk. The resin solution alone (no filler) was also cast on these disks to act as the control sample. The films were cured 10 minutes at 100° C., 25 minutes at 150° C. and 1 hour at 225° C. to a dry film thickness of about 4 mils. The frictional properties of the film coated disks were measured using a Westinghouse friction tester at a pressure of 80 p.s.i. and a speed of 70 feet per minute. This friction tester is described in Westinghouse Scientific Equipment Department Technical Bulletin 99–361 Aug., 1963. It consists of a base with a pneumatically floated seat, a specimen holder, a fixed specimen and a rotating specimen. The friction measuring and recording system consists of a strain gage force transducer and oscillograph which amplifies and records the transducer output. The results are tabulated below for tests run at room temperature:

TABLE I

| Sample | Coefficient of friction | Pin Wear, g./hour | Disk wear[1] g./hour |
|---|---|---|---|
| Example I resin unfilled (control) | 0.31 | 0.001 | 0.001 |
| Example I resin plus 10 weight percent $MoS_2$ filler | 0.25 | 0 | 0.0025 |
| Steel pin vs. steel disk with no film | 0.55 | 0.1 | [2] |

[1] Refers to abrasive action on film.
[2] Severe galling.

At room temperature the unfilled film (control sample) had uneven wear and wore through in 15 minutes. The filled film wore evenly and did not wear through after 60 minutes. The steel against steel disk sample showed severe galling after 2 minutes of operation.

This friction test was also run with the Example I resin sample containing 10 weight percent $MoS_2$ filler at a pressure of 80 p.s.i., a speed of 140 feet per minute and a temperature of 225° C. (437° F.). The results of this test gave an improved value for the coefficient of friction of 0.11. Pin and disk wear were not measured. During this test the film wore through in 10 minutes at 225° C. due to the presence of small blisters on the surface of the film.

EXAMPLE III

A piece of 3 mil thick steel foil was coated with 5 mils (dry film thickness) of the resin solution-filler combination of Example II (10 weight percent $MoS_2$ filler). The lubricating film metal coil composite was then cut to a suitable size and bent into a cylindrical shape having the filled organic film layer on the inner surface. This was then inserted into a piece of metal tubing to stimulate a bearing sleeve. The liner foil was cut to a size such that the cut ends just met but did not overlap within the inner circumference of the tube. The spring back of the steel foil caused the liner to hold its position against the wall of the sleeve and provided an antifriction surface on the inner wall. A solid rod of outside diameter slightly smaller than the inside diameter of the outer tube plus foil liner was inserted into the center of the construction to simulate a bearing shaft and was able to rotate freely against the film surface. FIG. 2 shows a similar application of the lubricating film foil composite.

EXAMPLE IV

A polyamic-acid precursor solution was formed by the reaction of equimolar quantities of benzophenone tetracarboxylic dianhydride and 4,4'-diaminophenyl ether in dimethyl acetamide as solvent to give a 16 percent solids solution having a viscosity of about 1300 centipoise at 25° C.

To each of two batches containing 100 grams of the above solution was added 1.6 grams (10 weight percent based on the weight of resin solids) of $MoS_2$ having a particle size between 1 to 5 microns. This filled resin was cast on ¾ inch diameter disks. The resin solution alone (no filler) was also cast on a disk to act as the control sample. These had a dry film thickness of about 4 mils and were cured as in Example II plus an additional 15 minutes at 250° C. These three coated disks were then tested for friction properties at room temperature and at 225° C. The results for this test are tabulated below:

TABLE II

| Sample | Coefficient of Friction | Pin Wear |
|---|---|---|
| Example V resin unfilled (control)* | 0.28 | none |
| Example V resin + 10 weight percent $MoS_2$ filler** | 0.11 | none |
| Example V resin + 10 weight percent $MoS_2$ filler** | 0.10 | none |

*Tested at room temperature at 80 p.s.i. and 70 feet per minute.
**Tested at 225° C. at 80 p.s.i. and 140 feet per minute.

The Westinghouse friction wear tester was used in the tests above.

EXAMPLE V

The preparation of Example IV was repeated using 0.64 grams and 6.4 grams of $MoS_2$ having a particle size between 1 to 5 microns (4 and 40 weight percent, respectively, based on the weight of resin solids). The dry film thickness used here was about 1 mil. In both cases the $MoS_2$ filled film was flexible and could be creased 180° without rupture.

EXAMPLE VI

A series of lubricants, namely $MoSe_2$, $WSe_2$, $WS_2$ and $MoS_2$ were incorporated into a series of 40 gram batches of the resin solution of Example IV which was reduced to 8 percent solids by dilution with dimethylacetamide. These lubricants were added to the resin solution on a constant volume basis using the least dense, more filling $MoS_2$ as the reference standard as follows:

A 40 gram dimethyl acetamide resin filler solution at 8 solids has 3.20 grams resin filler mix. Such a mix having 40 weight percent $MoS_2$ filler contains 1.28 grams $MoS_2$ filler. To find filler volume the formula: Volume = mass divided by density (V=M/D) can be used. $MoS_2$ has a density of 4.8 grams/c.c. In this Example the mass of $MoS_2$ is 1.28 grams. Using the formula above the volume $MoS_2$ in resin solution = (1.28 grams)/(4.8 grams per cubic centimeter) =0.267 cubic centimeters. The amount of the other fillers to be incorporated into the resin solution was calculated on the basis of 0.267 c.c. in 40 grams of resin filler solution so as to maintain about a 26.7 percent volume of filler among all filled films.

To the individual 40 gram batches of resin solution were added respectively, 1.28 grams (40 weight percent equaling 26.7 volume percent) $MoS_2$ having a particle size between 1 to 5 microns, 2.53 grams (79 weight percent) $WSe_2$ having a particle size between 60 to 70 microns, 2.53 grams (79 weight percent) $WSe_2$ having a 5 micron particle size, 1.60 grams (50 weight percent) $MoSe_2$ having a 2 to 10 micron particle size, and 1.99 grams (79 weight percent) $WS_2$ having a particle size of 60 to 70 microns.

The above solutions were thoroughly stirred and films were cast from these solutions onto aluminum foil in a similar fashion as in the other examples. The films were cured 15 minutes at 100° C., 15 minutes at 150° C., 1 hour at 225° C., and 15 minutes at 250° C. The $MoSe_2$, $MoS_2$ and 5 micron filler size $WSe_2$ samples produced homogeneous films that were densely populated with the lubricant particles and so offered utility for flat surface antifriction use.

The $MoSe_2$, $WS_2$ and $WSe_2$ samples tended to form agglomerates. It was thought that better mixing might improve the dispersion. Therefore, a 2.53 gram $WSe_2$ sample having a 5 micron particle size was wet ball milled 94 hours rather than mechanically stirred. The resulting film was cast on a glass plate and cured. Inspection indicated a more thorough dispersion of the $WSe_2$ particles. The film was stripped off the glass plate. It was fairly smooth and flexible and could be bent about 160° around a ¼ inch mandrel. It was not completely creasable, however. Proper dispersion by wet ball mill or other technique should also improve the qualities of the larger particle size filled films, especially the $MoSe_2$ films. It was felt that the parameters of flexibility in maximum dispersed $WSe_2$ and $MoSe_2$ films would be about 90 weight percent if small particle sizes were used. In conclusion, a high coefficient of friction for steel vs. steel disk was obtained as expected in Example II. However, a 54.5 percent decrease is obtained by loading the resin solution with 10 weight percent $MoS_2$ filler as compared to the uncoated steel surface and a 19.3 percent reduction in coefficient of friction is obtained compared to the unfilled control sample. Significantly, zero pin wear and minimal disk wear is obtained in the $MoS_2$ filled sample. At elevated temperatures an even greater reduction in coefficient of friction is obtained (56 percent additional) compared to the filled film at room temperature.

The results of the foregoing tests indicate that films with good lubricating properties, low frictional coefficients, good durability, tear and creasability can be made by incorporating from about 4 to 40 weight percent $MoS_2$ in amide-imide polymers. Higher weight percentages of $MoS_2$ particles would produce film substrate composites suitable for flat surface use.

$MoSe_2$ and $WSe_2$ can also be used at high filler content when proper mixing procedures are used to insure maximum dispersion throughout the lubricating film to give flexible cast films as shown in Example VI. $WS_2$ at particle sizes below about 20 microns should also give flexible cast films. Other lubricating fillers of the same class as above such as $NbSe_2$, $NbS_2$, $TaSe_2$ and $TaS_2$ at low particle sizes, about 1 to 5 microns, should also give suitable films for use in this invention.

This invention demonstrates that a satisfactory film containing a lubricating filler can be successfully cast on a metal foil substrate particularly a steel foil substrate, and that the resultant composite possesses useful antifriction characteristics at high temperatures. At the same time these composites offer ease of manufacture and the availability for many different uses from stored roll form.

While there have been shown and described what are at present considered to be the preferred embodiments of this invention, modifications thereto will readily occur to those skilled in the art. It is not desired therefore that the invention be limited to the specific embodiments and methods shown and described and it is intended to cover in the appended claims all such modifications as fall within the true spirit and scope of the invention.

We claim as our invention:

1. A method of making an antifriction high temperature composite comprising the steps:
   A. preparing a fluid solution of a soluble aromatic polyamic acid precursor of a resin selected from the group consisting of aromatic polyamide-imide and aromatic polyimide;
   B. thoroughly dispersing in the fluid resin precursor solution between about 4 to 80 weight percent discrete solid lubricant particles selected from the group consisting of $MoS_2$ having a particle size distribution between one-half to 50 microns, $MoSe_2$, $WSe_2$ and $WS_2$ having a particle size distribution between about one-half to 20 microns and $NbSe_2$ and $TaS_2$ having a particle size distribution between about one-half to 5 microns;
   C. casting the particle filled resin precursor solution as a thin film on a substrate to form a filled film-substrate composite; and then
   D. heating the composite to cure the filled resin film and form a solid, flexible matrix, of a plastic selected from the group consisting of aromatic polyamide-imide and aromatic polyimide, containing dispersed lubricant particles and to bond the film to the substrate.

2. The method of claim 1 wherein the particle filled resin solution is applied by painting on the substrate.

3. The method of claim 1 wherein the particle filled resin solution is applied by spraying on the substrate.

4. The method of claim 1 wherein the filled resin film is stripped off the substrate.

5. The method of claim 1 wherein the solid lubricant particles are $MoS_2$ particles.

6. The method of claim 5 wherein the solution of soluble aromatic polyamic acid precursor has a solids concentration below about 30 percent by weight.